(12) United States Patent
Kitano (10) Patent No.: US 11,546,347 B2
(45) Date of Patent: Jan. 3, 2023

(54) VERIFICATION APPARATUS, INFORMATION PROCESSING METHOD, AND PROGRAM

(71) Applicant: Sony Corporation, Tokyo (JP)

(72) Inventor: Hiroaki Kitano, Saitama (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 16/648,030

(22) PCT Filed: Jun. 25, 2018

(86) PCT No.: PCT/JP2018/024036
§ 371 (c)(1),
(2) Date: Mar. 17, 2020

(87) PCT Pub. No.: WO2019/058684
PCT Pub. Date: Mar. 28, 2019

(65) Prior Publication Data
US 2020/0259842 A1 Aug. 13, 2020

(30) Foreign Application Priority Data

Sep. 25, 2017 (JP) .............................. JP2017-183179

(51) Int. Cl.
*H04L 29/06* (2006.01)
*G06F 16/27* (2019.01)
(Continued)

(52) U.S. Cl.
CPC .............. *H04L 63/12* (2013.01); *G06F 16/27* (2019.01); *G06N 20/00* (2019.01); *G06Q 50/265* (2013.01)

(58) Field of Classification Search
CPC ......... H04L 63/12; G06F 16/27; G06N 20/00; G06Q 50/265
See application file for complete search history.

(56) References Cited

U.S. PATENT DOCUMENTS 8,037,538 B2 * 10/2011 Baba .................... H04L 12/2821
709/229
8,959,584 B2 * 2/2015 Piliouras ................. H04L 63/12
726/2

(Continued)

FOREIGN PATENT DOCUMENTS

JP          10-154976 A     6/1998
JP        2010068135 A     3/2010
(Continued)

OTHER PUBLICATIONS

International Written Opinion dated Sep. 11, 2018 in connection with International Application No. PCT/JP2018/024036, and English translation thereof.

(Continued)

*Primary Examiner* — Yonas A Bayou
(74) *Attorney, Agent, or Firm* — Wolf, Greenfield & Sacks, P.C.

(57) ABSTRACT

There is provided a verification apparatus including: an acquisition unit configured to acquire each of control data that causes artificial intelligence to function in an apparatus and learning data of the control data; and a verification unit configured to verify the acquired control data on the basis of the control data obtained as a result of performing learning with use of the acquired learning data, and on the basis of the acquired control data.

8 Claims, 5 Drawing Sheets

(51) Int. Cl.
*G06N 20/00* (2019.01)
*H04L 9/40* (2022.01)
*G06Q 50/26* (2012.01)

(56) References Cited

U.S. PATENT DOCUMENTS

| | | | | |
|---|---|---|---|---|
| 2003/0200468 | A1* | 10/2003 | Raley | G06Q 20/382 |
| | | | | 726/26 |
| 2005/0165643 | A1* | 7/2005 | Wilson | H04L 69/329 |
| | | | | 705/14.66 |
| 2013/0191904 | A1* | 7/2013 | Piliouras | G06Q 30/0269 |
| | | | | 726/7 |
| 2014/0358831 | A1 | 12/2014 | Adams et al. | |
| 2015/0150107 | A1* | 5/2015 | Piliouras | H04L 63/102 |
| | | | | 726/7 |
| 2016/0066059 | A1* | 3/2016 | Iwanami | H04N 21/4722 |
| | | | | 725/32 |
| 2016/0292129 | A1 | 10/2016 | Adams et al. | |
| 2016/0328653 | A1 | 11/2016 | Adams et al. | |
| 2016/0328655 | A1 | 11/2016 | Adams et al. | |
| 2017/0063886 | A1 | 3/2017 | Muddu et al. | |
| 2019/0171442 | A1* | 6/2019 | Machida | H04L 67/1031 |
| 2020/0076535 | A1* | 3/2020 | Xu | H04L 1/0057 |

FOREIGN PATENT DOCUMENTS

| | | |
|---|---|---|
| JP | 2016-523402 A | 8/2016 |
| JP | 2017002110 | 1/2017 |
| JP | 2017-201774 A | 11/2017 |
| WO | WO 2014/194161 A2 | 12/2014 |

OTHER PUBLICATIONS

International Preliminary Report on Patentability dated Apr. 9, 2020 in connection with International Application No. PCT/JP2018/024036, and English translation thereof.

Koimoto, From IoT to IoA, Extend humanity network. Nikkei Electronics. 2016. p. 89-101.

Extended European Search Report dated Sep. 24, 2020 in connection with European Application No. 18857783.7.

Higashikado et al., A study on certificate management in consortium chain. Jan. 24, 2017 Symposium on Cryptography and Information Security (SCIS). 7 pages.

Koimoto, From IoT to IoA, Extend humanity network. Nikkei Electronics. Feb. 2016. p. 89-101.

Suzuki, Interop Tokyo 2016, Internet Watch. Jun. 10, 2016. 7 pages. URL:https://internet.watch.impress.co.jp/docs/event/1004668.html [retrieved on Sep. 4, 2018].

Wheeler, Counting trusting trust through diverse double-compiling. Computer Security Applications Conference, 21$^{st}$ Annual Tucson, AZ, USA Dec. 5-9, 2005, Piscataway, NJ, USA, IEEE, Dec. 5, 2005. pp. 33-48, XP010869924, DOI: 10.1109/CSAC.2005.17. ISBN: 978-0-7695-2461-0.

International Search Report and English translation thereof dated Sep. 11, 2018 in connection with International Application No. PCT/JP2018/024036.

Higashikado et al., A study on certificate management in consortium chain. 2017 Symposium on Cryptography and Information Security (SCIS). 7 pages.

Suzuki, Interop Tokyo 2016, Internet Watch. 7 pages. URL:https://internet.watch.impress.co.jp/docs/event/1004668.html [retrieved on Sep. 4, 2018].

* cited by examiner

VERIFICATION APPARATUS, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2018/024036, filed in the Japanese Patent Office as a Receiving Office on Jun. 25, 2018, which claims priority to Japanese Patent Application Number JP2017-183179, filed in the Japanese Patent Office on Sep. 25, 2017, each of which is hereby incorporated by reference in its entirety.

TECHNICAL FIELD

The present disclosure relates to a verification apparatus, an information processing method, and a program.

BACKGROUND ART

A concept called Internet of ability (IoA) has been proposed in which people and robots bring individual "abilities" and exchange through a network, to open up unprecedented use regions. Examples of documents disclosed about the IoA include the following Non Patent Document 1, for example.

CITATION LIST

Non Patent Document

Non Patent Document 1: Junichi Rekimoto, "IoT to IoA, Network for augmenting humanity", Nikkei Electronics, February 2016, pp. 89 to 101.

SUMMARY OF THE INVENTION

Problems to be Solved by the Invention

Non Patent Document 1 describes that it is possible to extend experience, communicate collaborative work and abilities, and expand the existence, for example, by exchanging abilities through a network. However, Non Patent Document 1 does not describe how to realize the exchange of abilities through the network.

Here, as a method of realizing the exchange of abilities through the network, for example, it is conceivable to "enable acquisition of data for causing artificial intelligence to function in an apparatus through a network". However, considering a world where abilities are exchanged through the network, it is assumed that, for example, "a situation occurs where a malicious person creates data that causes artificial intelligence to perform an unusual behavior in a certain situation, and causes a state where the data can be acquired through the network". Then, in a case where the situation as described above occurs, it is not preferable from the viewpoint of safety because the artificial intelligence performs an unusual behavior in a certain situation. In particular, it is considered that "occurrence of the situation as described above is not allowed for data used in fields requiring a high level of safety, such as transportation, infrastructure, and military-related".

Consequently, assuming the world where abilities are exchanged through a network, it is considered that there is required a mechanism for verifying data that can be acquired through the network and that causes artificial intelligence to function in an apparatus.

The present disclosure proposes a new and improved verification apparatus, information processing method, and program capable of verifying data for causing artificial intelligence to function in an apparatus.

Solutions to Problems

According to the present disclosure, there is provided a verification apparatus including: an acquisition unit configured to acquire each of control data that causes artificial intelligence to function in an apparatus and learning data of the above-described control data; and a verification unit configured to verify the above-described acquired control data on the basis of the above-described control data obtained as a result of performing learning with use of the above-described acquired learning data and the above-described acquired control data.

Furthermore, according to the present disclosure, there is provided an information processing method to be executed by a verification apparatus. The information processing method includes the steps of: acquiring each of control data that causes artificial intelligence to function in an apparatus and learning data of the above-described control data; and verifying the above-described acquired control data on the basis of the above-described control data obtained as a result of performing learning with use of the above-described acquired learning data and the above-described acquired control data.

Furthermore, according to the present disclosure, there is provided a program for causing a computer to realize: a function of acquiring each of control data that causes artificial intelligence to function in an apparatus and learning data of the above-described control data; and a function of verifying the above-described acquired control data on the basis of the above-described control data obtained as a result of performing learning with use of the above-described acquired learning data and the above-described acquired control data.

Effects of the Invention

According to the present disclosure, it is possible to verify data for causing artificial intelligence to function in an apparatus.

Note that the effect described above is not necessarily limited, and in addition to the effect described above or instead of the effect described above, any of the effects described in this specification, or other effects that may be understood from the present specification may be exhibited.

MODE FOR CARRYING OUT THE INVENTION

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Furthermore, in the following, a description will be given in the following order.

1. Information processing method according to present embodiment
2. Verification apparatus according to present embodiment
3. Program according to present embodiment (Information Processing Method According to Present Embodiment)

Hereinafter, an information processing method according to the present embodiment will be described with an example of a case where a verification apparatus according to the present embodiment performs processing related to the information processing method according to the present embodiment.

[1] Outline of Information Processing Method According to Present Embodiment

As described above, considering a world where abilities are exchanged through a network, it is assumed that, for example, "a situation occurs where a malicious person creates data that causes artificial intelligence to perform an unusual behavior in a certain situation, and causes a state where the data can be acquired through the network". Then, it is considered that it is not preferable from the viewpoint of safety in a case where the situation as described above occurs, because the artificial intelligence performs an unusual behavior in a certain situation.

Therefore, the verification apparatus according to the present embodiment verifies control data that causes artificial intelligence to function in an apparatus. The verification apparatus according to the present embodiment compares control data obtained as a result of performing learning with use of learning data of the control data with control data as a verification target, to verify that the control data as a verification target is data learned with use of the learning data.

The artificial intelligence according to the present embodiment means, for example, a computer program for causing a machine to perform what humans perform with use of intelligence (a computational part of abilities for achieving actual goals). Since the artificial intelligence is a computer program as described above, it is possible to share at least a part of some ability involved with physical work or intellectual work by a plurality of apparatuses by exchanging data through a network.

The control data according to the present embodiment corresponds to learned data for causing artificial intelligence to function. For example, the learned data is obtained by performing learning with any learning method such as deep learning using a learning algorithm such as an error back propagation method, or deep reinforcement learning that combines deep learning and reinforcement learning. Examples of the learned data include, for example, any data (or a data group) that can serve as an artificial intelligence module, such as a learned neural network module.

The learning data according to the present embodiment is data for performing learning by deep learning, deep reinforcement learning, or the like. Examples of the learning data include, for example, information indicating a network structure, a hyperparameter, and a training data set. Two or more of the information indicating a network structure, the hyperparameter, and the training data set may be packaged.

The information indicating a network structure according to the present embodiment is, for example, information indicating a structure of any network such as a neural network. Examples of the information indicating a network structure include, for example, data in any format that can express a relationship between data in a graph structure.

The hyperparameter according to the present embodiment is a parameter for learning. In a case, as an example, where the information indicating a network structure is information indicating a structure of a neural network, examples of the hyperparameter include, for example, the number of neurons, the number of network layers, a learning rate, and the like. Note that the hyperparameter according to the present embodiment is not limited to the example shown above, but may be, for example, any parameter capable of allowing latitude to a network indicated by the information indicating a network structure, by performing learning.

The training data set according to the present embodiment is a data group including a plurality of pieces of training data to be used for learning. Examples of the training data include data in any format according to a learning content, such as image data and text data.

Furthermore, the training data set may include setting data that gives randomness to learning, for example. In a case, as an example, where the error back propagation method is used, examples of the above-described setting data include, for example, an initial value of a network connection weight and data indicating an order of training data. Furthermore, for example, in a case where a method called Dropout is used as a method of suppressing overlearning, the setting data described above includes data indicating which node has been invalidated in which update cycle. That is, the training data set may include, as the setting data, any data that gives randomness to learning.

Note that the above-described setting data is not limited to being included in the training data set. For example, the above-described setting data can be regarded as conceptually different data from the training data set.

Here, if the learning data used for learning the control data as a verification target and the learning data to be used for new learning are the same including randomness of learning, the control data obtained as a result of newly performing learning with use of the learning data is coincident with the control data as a verification target.

Furthermore, in a case where the control data obtained as a result of newly performing learning with use of the learning data is not coincident with the control data as a verification target, there is a high possibility that the control data as a verification target is "control data obtained as a result of performing learning with use of learning data different from the learning data newly used for learning". That is, in a case where the control data obtained as a result of newly performing learning with use of the learning data is not coincident with the control data as a verification target, there is a possibility that the control data as a verification target is "data that causes artificial intelligence to perform an unusual behavior in a certain situation, by a malicious person".

Therefore, the verification apparatus according to the present embodiment can verify the control data as a verification target by determining whether or not the control data obtained as a result of newly performing learning with use of learning data is coincident with the control data as a verification target. More specifically, the verification apparatus according to the present embodiment can verify validity of the control data as a verification target, by verifying whether the control data as a verification target is the control data that has been learned with use of the learning data used for the new learning.

Note that processing related to new learning using learning data may be performed by the verification apparatus according to the present embodiment, or may be performed by an external apparatus of the verification apparatus according to the present embodiment. In a case where the processing related to new learning using learning data is performed by an external apparatus, the verification apparatus according to the present embodiment verifies the control data as a verification target by acquiring control data obtained as a result of learning from the external apparatus. Hereinafter, a case is exemplified where the verification apparatus according to the present embodiment performs the processing related to new learning using learning data.

[2] Processing Related to Information Processing Method According to Present Embodiment Next, processing related to the information processing method according to the present embodiment will be described.

Figure 1:
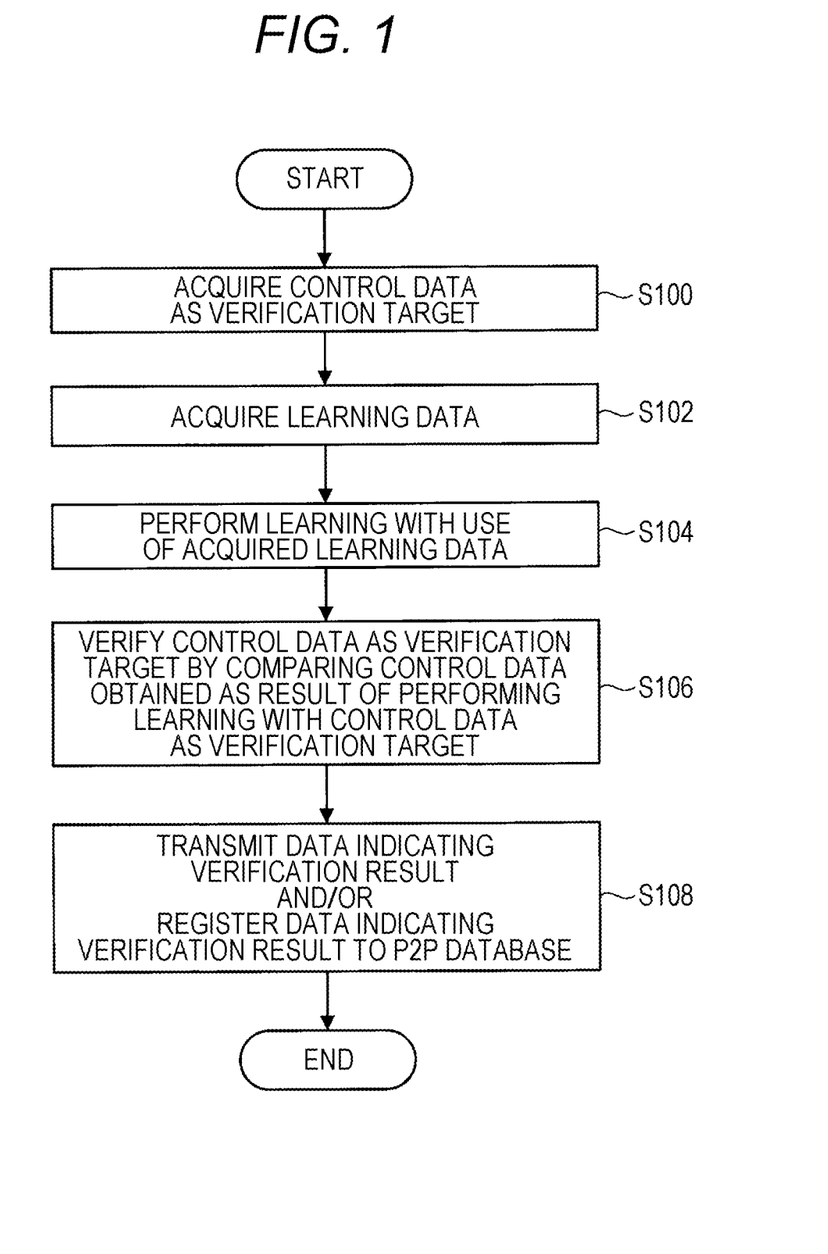
FIG. 1 is a flowchart for explaining an example of processing related to an information processing method according to the present embodiment.

FIG. 1 is a flowchart for explaining an example of processing related to the information processing method according to the present embodiment. The verification apparatus according to the present embodiment acquires control data (S100). The control data acquired in step S100 corresponds to control data as a verification target.

For example, the verification apparatus according to the present embodiment acquires the control data by reading the control data from a recording location designated by an operation and the like of a user of the verification apparatus according to the present embodiment (hereinafter simply referred to as "user"). Examples of the above-described recording location include, for example, a recording medium provided in the verification apparatus according to the present embodiment such as a storage unit (described later), an external recording medium such as removable media, a recording medium provided in an external apparatus capable of communicating with the verification apparatus according to the present embodiment, a peer to peer (P2P) database described later, or the like.

Note that the method for acquiring the control data as a verification target is not limited to the example described above. For example, the verification apparatus according to the present embodiment may acquire the control data by searching for control data that matches a search condition designated by a user operation and the like from a recording medium such as a storage unit (described later), a P2P database described later, or the like.

The verification apparatus according to the present embodiment acquires learning data (S102). The control data acquired in step S102 corresponds to learning data for performing new learning. The verification apparatus according to the present embodiment acquires the learning data by reading the learning data from a recording location designated by a user operation or the like, for example.

The verification apparatus according to the present embodiment performs learning with use of the learning data acquired in step S102, and acquires control data that is a result of performing the learning (S104). As described above, randomness is given to the learning by performing the learning on the basis of the learning data including the setting data described above.

The verification apparatus according to the present embodiment compares the control data obtained as a result of performing the learning in step S104 with the control data as a verification target acquired in step S100, to verify the control data as a verification target (S106). For example, the verification apparatus according to the present embodiment verifies that the control data as a verification target is data learned with use of the learning data acquired in step S102, by determining whether the control data obtained as a result of performing learning is coincident with the control data as a verification target.

For example, the verification apparatus according to the present embodiment compares binary between control data obtained as a result of performing learning and control data as a verification target. Then, the verification apparatus according to the present embodiment determines that "the control data obtained as a result of performing learning is coincident with the control data as a verification target" in a case where the binary is coincident between the control data obtained as a result of performing learning and the control data as a verification target. Furthermore, the verification apparatus according to the present embodiment does not determine that "the control data obtained as a result of performing learning is coincident with the control data as a verification target" in a case where the binary is not coincident between the control data obtained as a result of performing learning and the control data as a verification target.

The verification apparatus according to the present embodiment determines whether the control data obtained as a result of performing learning is coincident with the control data as a verification target, for example, by the binary comparison as described above, to verify the control data as a verification target. Note that the method for determining whether the control data obtained as a result of performing learning is coincident with the control data as a verification target is not limited to the binary comparison. For example, the verification apparatus according to the present embodiment may determine whether the control data obtained as a result of performing learning is coincident with the control data as a verification target by any method that can determine coincidence between data.

Note that "in a case where the processing in step S104 is performed after emulating a hardware environment at a time when learning has been performed with use of the learning data acquired in step S102 in the past", or "in a case where the processing in step S104 is performed in the same hardware environment as a hardware environment at a time when learning has been performed with use of the learning data acquired in step S102 in the past", it is possible to further improve the determination accuracy in step S106.

When a verification result is obtained by the processing of step S106, the verification apparatus according to the present embodiment transmits data indicating the verification result to a set transmission destination, and/or registers the data indicating the verification result to the P2P database (S108).

Examples of the data indicating the verification result according to the present embodiment include, for example, a flag indicating whether or not the control data as a verification target is valid control data. Note that the data indicating the verification result according to the present embodiment is not limited to the example described above. For example, the data indicating the verification result according to the present embodiment may be any data that can indicate the verification result, such as data in which the verification result is represented by a character string or an image. Furthermore, the data indicating the verification result according to the present embodiment may include, by an electronic watermark and the like, data indicating the verification apparatus according to the present embodiment that has performed the verification (for example, an apparatus ID), and data indicating a verification institution that has performed the verification (for example, a verification institution ID, data indicating a name or logo of the verification institution, and the like).

In a case of transmitting the data indicating the verification result to the set transmission destination, the verification apparatus according to the present embodiment specifies the transmission destination by reading data indicating the transmission destination (for example, data indicating an e-mail address, data indicating an Internet protocol (IP) address, and the like), from a recording medium such as a storage unit (described later). Then, the verification apparatus according to the present embodiment transmits the data indicating the verification result to the specified transmission destination via a communication unit (described later) provided in the verification apparatus according to the present embodiment, or an external communication device connected to the verification apparatus according to the present embodiment.

By the verification apparatus according to the present embodiment transmitting data indicating the verification result to the set transmission destination, reporting the verification result to a specific person corresponding to the transmission destination is realized.

Furthermore, as shown in FIG. 1, the verification apparatus according to the present embodiment can also register the data indicating the verification result to the P2P database.

The P2P database is an example of a distributed file system using a P2P network. Examples of the P2P database include, for example, blockchain data circulating in the P2P network. Examples of the blockchain data according to the present embodiment include, for example, blockchain data used for exchanging virtual currency data, such as Bitcoin and Ethereum. Note that, it is needless to say that the blockchain data according to the present embodiment is not limited to the blockchain data used for exchanging virtual currency data. Furthermore, the P2P database according to the present embodiment is not limited to blockchain data, but may be any distributed file system capable of realizing the distributed file system using the P2P network.

Figure 2:
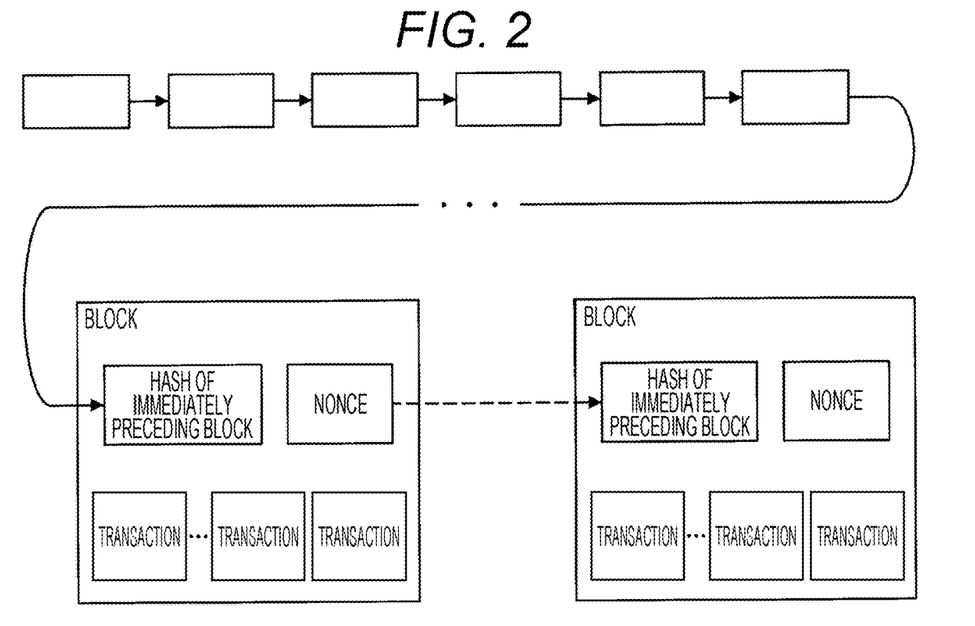
FIG. 2 is an explanatory view showing an example of a P2P database.

FIG. 2 is an explanatory view showing an example of the P2P database, and shows an example of blockchain data.

As shown in FIG. 2, the blockchain data is data in which a plurality of blocks is connected and included just like a chain. Each block includes data for one or more transactions. Furthermore, examples of the transaction data include various data such as, for example, data indicating transaction details such as a value of virtual currency that has been traded, data indicating an address corresponding to a public key of a participant of the P2P network who generates the transaction (an apparatus that forms the P2P network, which similarly applies hereinafter), control data, and data indicating a verification result.

The blockchain data includes, for example, a hash of an immediately preceding block and a value called nonce. The hash of the immediately preceding block is used, for example, to determine whether or not to be a "correct block" that is correctly connected from the immediately preceding block. The nonce is used, for example, to prevent spoofing in authentication using a hash, and tampering is prevented by using the nonce. Examples of the nonce include, for example, data indicating a character string, a numeric string, or a combination thereof.

Furthermore, in the blockchain data, an electronic signature using an encryption key may be given to transaction data, and the transaction data may be encrypted using the encryption key.

Data for each transaction is disclosed and shared in the entire P2P network. Note that, depending on a type of the P2P database, there may be a case where the same record is not necessarily held in the entire P2P network.

Addition of a new block (generation of a new block) to the blockchain data in the P2P network is performed, for example, by a method called proof of work (PoW) or a method called proof of stake (PoS). The PoW is a method in which a new block is generated by a person who has solved a mathematical problem earliest among participants in a P2P network (for example, a person who has first found a hash satisfying a specific condition). Furthermore, the PoS is, for example, a method in which a new block is generated by a person who has solved a mathematical problem earliest that varies in difficulty depending on assets that are held by participants and determined by an amount of virtual currency, a period of holding the virtual currency, and the like (for example, a person who has first found a hash satisfying a specific condition according to difficulty). Note that a method for adding a new block to the blockchain data in the P2P network according to the present embodiment is not particularly limited.

Figure 3:
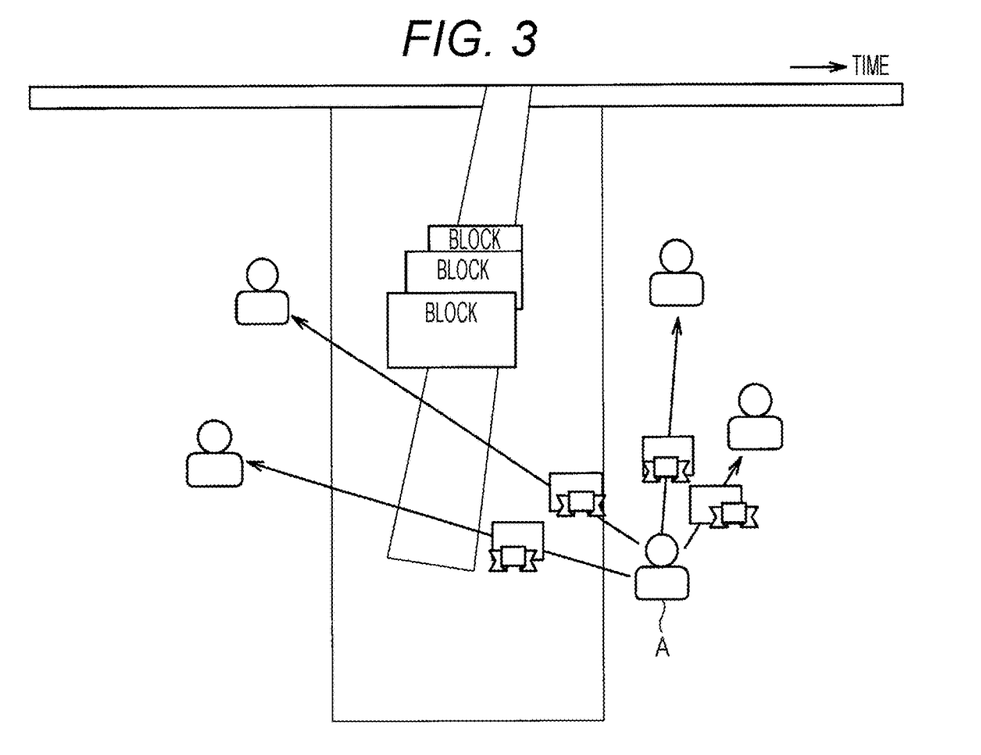
FIG. 3 is an explanatory view showing an example of data registration to the P2P database to a P2P network.

FIG. 3 is an explanatory view showing an example of data registration to the P2P database in the P2P network, and shows an example of data registration to blockchain data (an example of the P2P database).

For example, a participant A of the P2P network performs an electronic signature on data to be registered in the blockchain data, by using a secret key of the participant A. By performing the electronic signature on the data to be registered in the blockchain data with use of the secret key of the participant A, for example, it is ensured that the data is obtained from the participant A, an owner of the data is the participant A, and the like. Furthermore, the participant A of the P2P network may encrypt the data to be registered in the blockchain data, by using a public key of the participant A or the like. Note that, it is needless to say that the electronic signature using the secret key or the encryption using the public key and the like need not be performed in data registration to the P2P database.

When the electronic signature is performed, the participant A broadcasts transaction data including the data subjected to the electronic signature, on the P2P network. The transaction data broadcast on the P2P network is registered in the blockchain data by being included in a block created by any participant of the P2P network.

Note that the method for data registration to the P2P database in the P2P network is not limited to the example shown above. For example, in the P2P network, data can be registered in the P2P database by using a side chain technology.

Figure 4:
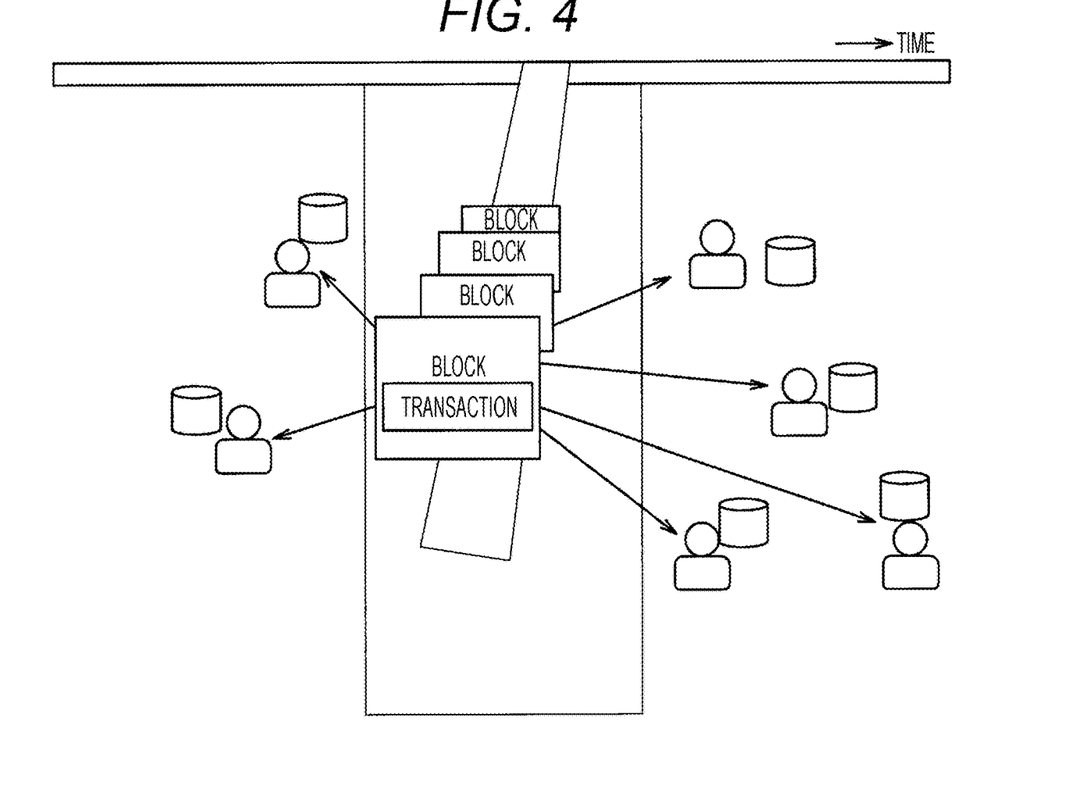
FIG. 4 is an explanatory view showing an example of data acquisition from the P2P database in the P2P network.

FIG. 4 is an explanatory view showing an example of data acquisition from the P2P database in the P2P network, and shows an example of data acquisition from blockchain data (an example of the P2P database).

The data to be registered to the blockchain data by a participant of the P2P network is, for example, registered to the blockchain data as described with reference to FIG. 3, and as a result, the registered data is shared by all participants in the P2P network, for example. Consequently, each participant in the P2P network can acquire data registered in the blockchain data by a participant of the P2P network and stored in the blockchain data, for example, by referring to the blockchain data stored in a recording medium corresponding to each participant.

Note that, as described above, depending on a type of the P2P database, there may be a case where the same record is not necessarily held in the entire P2P network. In the above case, the data registered to the blockchain data by a participant of the P2P network is shared by some participants of the P2P network, and some participants can acquire the registered data by referring to the blockchain data stored in a corresponding recording medium.

Furthermore, for example, in a case where an electronic signature using a secret key is performed on the data registered in the blockchain data, the participant who has acquired the registered data can verify validity of the acquired registered data by using a public key corresponding to the secret key. Furthermore, for example, in a case where encryption using a public key has been performed on the data registered in the blockchain data, the participant who has acquired the registered data decrypts the acquired registered data, by using a secret key corresponding to the public key.

The verification apparatus according to the present embodiment registers data indicating a verification result to the P2P database as described with reference to FIG. 3, for example. By the verification apparatus according to the present embodiment registering the data indicating the verification result to the P2P database, the verification result can be acquired by an unspecified number of persons who can (directly or indirectly) access the P2P database. By the verification apparatus according to the present embodiment registering data indicating a verification result to the P2P database, it is ensured that the verification result has not been tampered with.

The verification apparatus according to the present embodiment performs, for example, the processing shown in FIG. 1 as processing related to the information processing method according to the present embodiment. By performing the processing shown in FIG. 1, control data as a verification target (data for causing artificial intelligence to function in an apparatus) is verified. Furthermore, by performing the processing shown in FIG. 1, the verification result can be reported to a specific person and/or the verification result can be shared by an unspecified number of persons.

Note that the processing related to the information processing method according to the present embodiment is not limited to the example shown in FIG. 1.

For example, the verification apparatus according to the present embodiment need not perform the processing of step S108 shown in FIG. 1. Even in a case where the processing of step S108 is not performed, the verification apparatus according to the present embodiment can verify control data as a verification target (data for causing artificial intelligence to function in an apparatus).

Furthermore, the verification apparatus according to the present embodiment may visually notify a verification result, for example, by causing a display screen of a display device to display the verification result. Furthermore, the verification apparatus according to the present embodiment may audibly notify the verification result, for example, by causing an audio output device such as a speaker to output voice indicating the verification result.

Verification Apparatus According to Present Embodiment

Next, a description is given to an example of a configuration of the verification apparatus according to the present embodiment capable of performing processing related to the information processing method according to the present embodiment described above.

In the following, while explaining an example of "an information processing system according to the present embodiment that has the verification apparatus according to the present embodiment and is capable of sharing abilities through a network", a description is given to an example of a configuration of the verification apparatus according to the present embodiment. Note that, it is needless to say that the verification apparatus according to the present embodiment is not limited to an apparatus included in the information processing system according to the present embodiment, which will be described later.

Figure 5:
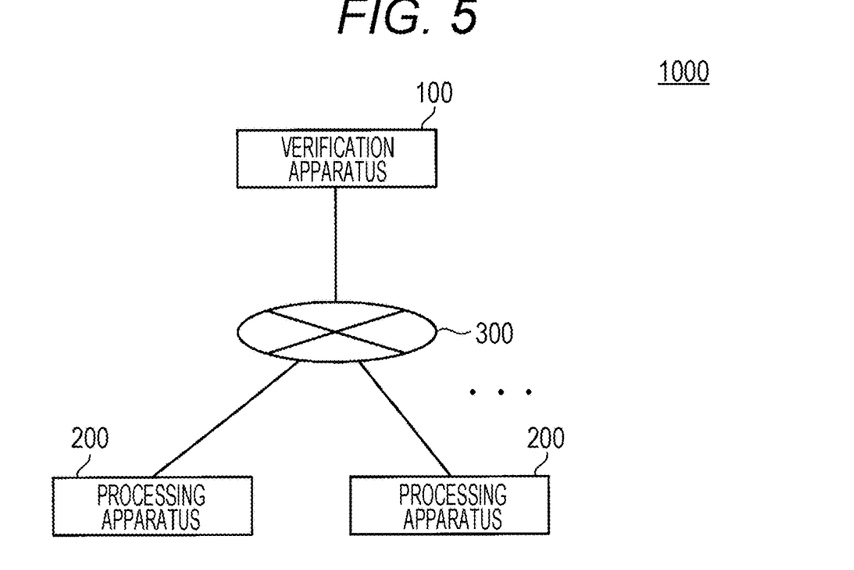
FIG. 5 is an explanatory view showing an example of a configuration of an information processing system according to the present embodiment having a verification apparatus according to the present embodiment.

FIG. 5 is an explanatory view showing an example of a configuration of an information processing system 1000 according to the present embodiment including a verification apparatus 100 according to the present embodiment. The information processing system 1000 includes, for example, the verification apparatus 100 and a processing apparatus 200.

The verification apparatus 100 and the processing apparatus 200 are connected to form a network 300, for example, in a wired or wireless manner. Examples of the network 300 include, for example, a distributed network such as a P2P network. Hereinafter, a case will be mainly exemplified where the network 300 is a P2P network in which various apparatuses included in the information processing system 1000 are connected in an autonomous distributed manner. The verification apparatus 100 and the processing apparatus 200 that are shown to be connected via the network 300 in FIG. 1 correspond to apparatuses forming the P2P network. Note that, it is needless to say that the network 300 is not limited to the P2P network.

Note that the information processing system according to the present embodiment is not limited to the example shown in FIG. 5.

For example, each of the number of the verification apparatuses 100 forming the network 300 in FIG. 5 and the number of the processing apparatuses 200 forming the network 300 in FIG. 5 is an example, and the number of various apparatuses forming the network 300 is not limited to the example shown in FIG. 5.

Furthermore, for example, in FIG. 5, the verification apparatus 100 and the processing apparatus 200 are represented as separate apparatuses. However, at least a part of each of the verification apparatus 100 and the processing apparatus 200 forming the network 300 may function as the verification apparatus 100 and the processing apparatus 200.

Hereinafter, with the information processing system 1000 shown in FIG. 5 as an example, apparatuses included in the information processing system according to the present embodiment will be described.

[I] Verification Apparatus 100

[I-1] Configuration of Verification Apparatus 100

The verification apparatus 100 is an apparatus that performs processing related to the information processing method according to the present embodiment described above, and verifies control data as a verification target.

Figure 6:
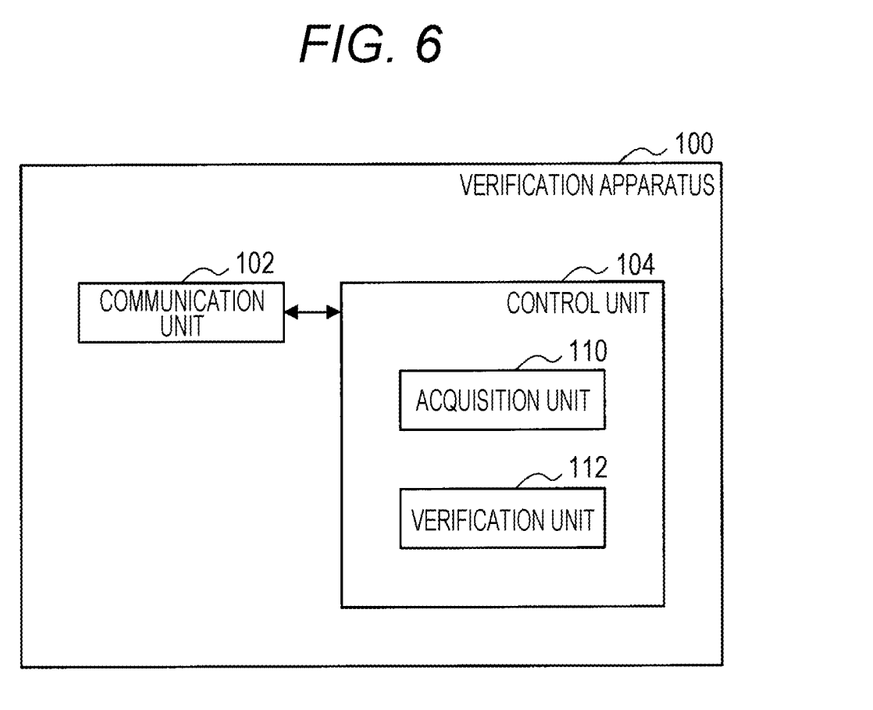
FIG. 6 is a block diagram showing an example of a configuration of the verification apparatus according to the present embodiment.

FIG. 6 is a block diagram showing an example of a configuration of the verification apparatus 100 according to the present embodiment. The verification apparatus 100 includes a communication unit 102 and a control unit 104, for example.

Furthermore, the verification apparatus 100 may include, for example, a read only memory (ROM) (not shown), a random access memory (RAM) (not shown), a storage unit (not shown), an operation unit (not shown) that can be operated by a user of the verification apparatus 100, a display part (not shown) that displays a various screens on a display screen, and the like. The verification apparatus 100 connects each of the above-described components by a bus as a data transmission path, for example.

The ROM (not shown) stores control data such as a program and calculation parameters to be used by the control unit 104. The RAM (not shown) temporarily stores a program and the like to be executed by the control unit 104.

The storage unit (not shown) is storage means provided in the verification apparatus 100, and stores, for example, various data such as data related to the information processing method according to the present embodiment, such as data indicating a transmission destination, and various applications. Here, examples of the storage unit (not shown) include, for example, a magnetic recording medium such as a hard disk, a non-volatile memory such as a flash memory, and the like. Furthermore, the storage unit (not shown) may be attachable to and detachable from the verification apparatus 100. Note that the verification apparatus 100 may not include a storage unit (not shown), and various data such as data related to the information processing method according to the present embodiment may be stored in an external recording medium of the verification apparatus 100.

Examples of the operation unit (not shown) include an operation input device to be described later. Furthermore, examples of the display unit (not shown) include a display device to be described later. Note that the verification apparatus 100 need not include one or both of the operation unit (not shown) and the display unit (not shown).

Hardware Configuration Example of Verification Apparatus 100

Figure 7:
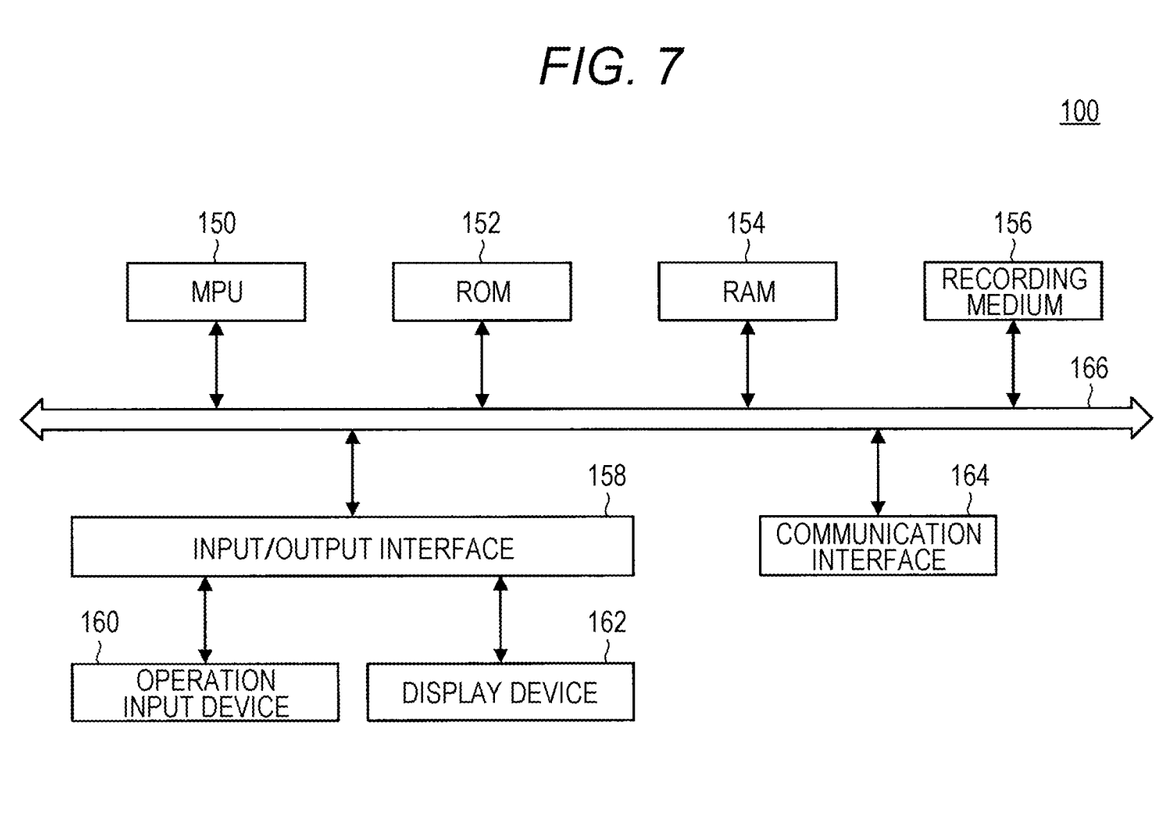
FIG. 7 is an explanatory view showing an example of a hardware configuration of the verification apparatus according to the present embodiment.

FIG. 7 is an explanatory view showing an example of a hardware configuration of the verification apparatus 100 according to the present embodiment. The verification apparatus 100 includes, for example, an MPU 150, a ROM 152, a RAM 154, a recording medium 156, an input/output interface 158, an operation input device 160, a display device 162, and a communication interface 164. Furthermore, the verification apparatus 100 connects between individual components with a bus 166 as a data transmission path, for example. Furthermore, the verification apparatus 100 is driven, for example, by power supplied from an internal power source such as a battery provided to the verification apparatus 100, power supplied from a connected external power source, or the like.

The MPU 150 includes, for example, one or more processors configured with an arithmetic circuit such as a micro processing unit (MPU), various processing circuits, and the like, and functions as the control unit 104 that controls the entire verification apparatus 100. Furthermore, the MPU 150 serves as, for example, an acquisition unit 110 and a verification unit 112 described later in the verification apparatus 100. Note that one or both of the acquisition unit 110 and the verification unit 112 may be configured with a dedicated (or general-purpose) circuit (for example, a processor separate from the MPU 150, and the like).

The ROM 152 stores control data and the like such as a program and calculation parameters to be used by the MPU 150. The RAM 154 temporarily stores, for example, a program and the like to be executed by the MPU 150.

The recording medium 156 functions as a storage unit (not shown), and stores various data such as data related to the information processing method according to the present embodiment, and various applications, for example. Here, examples of the recording medium 156 include, for example, a magnetic recording medium such as a hard disk, and a non-volatile memory such as a flash memory. Furthermore, the recording medium 156 may be attachable to and detachable from the verification apparatus 100.

The input/output interface 158 connects, for example, the operation input device 160 and the display device 162. The operation input device 160 functions as an operation unit (not shown), and the display device 162 functions as a display unit (not shown). Here, examples of the input/output interface 158 include, for example, a universal serial bus (USB) terminal, a digital visual interface (DVI) terminal, a high-definition multimedia interface (HDMI) (registered trademark) terminal, various processing circuits, and the like.

Furthermore, for example, the operation input device 160 is provided on the verification apparatus 100, and is connected to the input/output interface 158 inside the verification apparatus 100. Examples of the operation input device 160 include, for example, a button, a direction key, a rotary selector such as a jog dial, a combination thereof, or the like.

Furthermore, for example, the display device 162 is provided on the verification apparatus 100, and is connected to the input/output interface 158 inside the verification apparatus 100. Examples of the display device 162 include, for example, a liquid crystal display, an organic EL display, and the like.

Note that, it is needless to say that the input/output interface 158 can be connected to an external device such as an external operation input device (for example, a keyboard, a mouse, or the like) of the verification apparatus 100, or an external display device. Furthermore, the display device 162 may be, for example, a device capable of displaying and user operation, such as a touch panel.

The communication interface 164 is communication means included in the verification apparatus 100, and functions as, for example, an external apparatus such as an apparatus other than the apparatuses included in the processing apparatus 200 or the information processing system 1000, and the communication unit 102 to perform wireless or wired communication. Here, examples of the communication interface 164 include, for example, a communication antenna and a radio frequency (RF) circuit (wireless communication), an IEEE802.15.1 port and a transmission/reception circuit (wireless communication), an IEEE802.11 port and a transmission/reception circuit (wireless communication), a LAN terminal and a transmission/reception circuit (wired communication), or the like. Furthermore, the communication interface 164 may have any configuration capable of communicating with apparatuses forming the network 300.

The verification apparatus 100 performs the processing related to the information processing method according to the present embodiment described above, for example, with the configuration shown in FIG. 7. Note that the hardware configuration of the verification apparatus 100 according to the present embodiment is not limited to the configuration shown in FIG. 7.

For example, the verification apparatus 100 need not include the communication interface 164 in a case of communicating with an external apparatus or the like via a connected external communication device. Furthermore, the communication interface 164 may have a configuration to be able to communicate with one or more external apparatuses and the like by a plurality of communication methods.

Furthermore, the verification apparatus 100 may have a configuration that does not include some or all of the recording medium 156, the operation input device 160, and the display device 162, for example.

Furthermore, the verification apparatus 100 may further include an audio output device such as a speaker, for example.

Furthermore, the verification apparatus 100 can have a configuration according to an application example of the verification apparatus 100 described later, for example.

Furthermore, for example, a part or all of the configuration shown in FIG. 7 (or a configuration according to a modified example) may be realized by one or more integrated circuits (ICs).

With reference to FIG. 6 again, an example of the configuration of the verification apparatus 100 will be described. The communication unit 102 is communication means included in the verification apparatus 100, and communicates with an external apparatus in a wired or wireless manner. Furthermore, the communication unit 102 can communicate with apparatuses other than the apparatuses included in the information processing system 1000 in a wired or wireless manner. The communication of the communication unit 102 is controlled by the control unit 104, for example.

Here, examples of the communication unit 102 include, for example, a communication antenna and an RF circuit, a LAN terminal and a transmission/reception circuit, and the like, but the configuration of the communication unit 102 is not limited to the above. For example, the communication unit 102 can have a configuration according to any standard that allows communication, such as USB terminal and a transmission/reception circuit, or any configuration capable of communicating with the apparatuses forming the network 300. Furthermore, the communication unit 102 may have a configuration to be able to communicate with one or more external apparatuses and the like by a plurality of communication methods.

The control unit 104 is configured with an MPU and the like, for example, and serves to control the entire verification apparatus 100. Furthermore, the control unit 104 includes, for example, the acquisition unit 110 and the verification unit 112, and takes a leading role to perform processing related to the information processing method according to the present embodiment.

The acquisition unit 110 acquires each of control data as a verification target and learning data. The acquisition unit 110 acquires the control data as a verification target, for example, by performing the processing of step S100 in FIG. 1. Furthermore, the acquisition unit 110 acquires learning data, for example, by performing the processing of step S102 in FIG. 1.

The verification unit 112 verifies the control data as a verification target on the basis of the control data obtained as a result of performing learning with use of the acquired learning data and on the basis of the acquired control data as a verification target.

The verification unit 112 verifies the control data as a verification target, for example, by performing the processing of step S104 and step S106 in FIG. 1.

Note that, as described above, the processing related to new learning using the acquired learning data may be performed by the verification apparatus 100 (for example, the MPU 150 functioning as the verification unit 112), or may be performed by an external apparatus of the verification apparatus 100. In a case where the processing related to new learning using learning data is performed by an external apparatus, the verification unit 112 acquires control data obtained as a result of learning from the external apparatus through communication by the communication unit 102, for example. Then, the verification unit 112 verifies the control data as a verification target by using the control data obtained as a result of learning acquired from the external apparatus to perform the processing of step S106 in FIG. 1.

More specifically, for example, by comparing binary between the control data obtained as a result of performing learning and the control data as a verification target, the verification unit 112 determines whether the control data obtained as a result of performing learning is coincident with the control data as a verification target. Then, for example, by a determination result whether or not the control data obtained as a result of performing learning is coincident with the control data as a verification target, the verification unit 112 verifies whether the control data as a verification target is data learned with use of the acquired learning data.

Furthermore, the verification unit 112 may transmit data indicating the verification result to a set transmission destination, and/or may register the data indicating the verification result to the P2P database. By performing, for example, the processing of step S108 and step S106 in FIG. 1, the verification unit 112 transmits the data indicating the verification result to the set transmission destination. Furthermore, the verification unit 112 registers the data indicating the verification result to the P2P database, for example, by performing the processing of step S108 and step S106 in FIG. 1.

The control unit 104 performs processing related to the information processing method according to the present embodiment, by having the acquisition unit 110 and the verification unit 112, for example.

Note that the configuration of the control unit 104 is not limited to the example shown in FIG. 6.

For example, the control unit 104 may further include a notification processing unit that notifies a verification result. The notification processing unit visually notifies the verification result, for example, by displaying the verification result on a display screen of the display device 162 or a display screen of an external display device. Furthermore, the notification processing unit audibly notifies the verification result by causing an audio output device (not shown) provided in the verification apparatus 100 or an external audio output device to output voice indicating the verification result.

Furthermore, the control unit 104 can have a configuration according to, for example, a way of segmenting the processing related to the information processing method according to the present embodiment.

The verification apparatus 100 performs the processing related to the information processing method according to the present embodiment described above, for example, with the configuration shown in FIG. 6, to verify the control data as a verification target.

Here, the verification apparatus 100 verifies validity of the control data as a verification target by verifying whether the control data as a verification target is the control data that has been learned with use of the learning data used for the new learning. That is, even if "control data that causes artificial intelligence to perform an unusual behavior in a certain situation" is generated, the verification apparatus 100 can detect that the control data is not control data (valid control data) learned with use of the learning data, by verifying the control data.

Therefore, the verification apparatus 100 can verify data for causing artificial intelligence to function in an apparatus. Furthermore, the verification apparatus 100 can realize a mechanism for verifying data that is to cause artificial intelligence to function in an apparatus and that can be acquired through a network.

Furthermore, for example, with the configuration shown in FIG. 6, the verification apparatus 100 can exhibit the effect that is achieved by performing the processing related to the information processing method according to the present embodiment as described above. In one example, by verifying the control data in the verification apparatus 100, it is possible to further reduce the possibility of occurrence of, for example, "a situation where a malicious person creates data that causes artificial intelligence to perform an unusual behavior in a certain situation, and causes a state where the data can be acquired through the network".

Note that the configuration of the verification apparatus according to the present embodiment is not limited to the configuration shown in FIG. 6.

For example, the verification apparatus according to the present embodiment can include one or both of the acquisition unit 110 and the verification unit 112 shown in FIG. 6 separately from the control unit 104 (for example, can realize one or both of the acquisition unit 110 and the verification unit 112 by another processing circuit).

Furthermore, for example, in a case of communicating with an external apparatus via an external communication device having a function and a configuration similar to those of the communication unit 102, the verification apparatus according to the present embodiment need not include the communication unit 102.

[I-2] Application Example of Verification Apparatus According to Present Embodiment Although a description has been given with the verification apparatus as the present embodiment above, the present embodiment is not limited to this form. The verification apparatus according to the present embodiment can be applied to any equipment that can perform the processing related to the information processing method according to the present embodiment described above, such as, for example, "a computer such as a personal computer (PC) or a server", "a tablet device", or "a game machine". Furthermore, the verification apparatus according to the present embodiment can be applied to equipment that functions as the processing apparatus 200 described later. Moreover, the verification apparatus according to the present embodiment can also be applied to an IC that can be incorporated into equipment as described above, for example.

Furthermore, the verification apparatus according to the present embodiment may be applied to a processing system assuming a connection to a network (or communication between individual apparatuses), for example, such as cloud computing. Examples of the processing system described above include, for example, "a system in which a part of the processing related to the information processing method is performed by one apparatus included in the processing system, and processing other than the part of the processing related to the information processing method is performed by another apparatus included in the processing system", and the like.

[II] Processing Apparatus 200

The processing apparatus 200 is an apparatus capable of performing processing using artificial intelligence. In the processing apparatus 200, for example, the artificial intelligence functions with control data acquired through the network 300. That is, the ability of artificial intelligence in the processing apparatus 200 may vary depending on the acquired control data.

Furthermore, for example, the processing apparatus 200 may cause the artificial intelligence to function with the control data after confirming validity of the control data, by acquiring data indicating a verification result through the network 300, for example.

The processing apparatus 200 has a hardware configuration (including a modified example) similar to that of the verification apparatus 100 shown in FIG. 7, for example. The processing in the processing apparatus 200 is performed by a processor such as the MPU 150 shown in FIG. 7, for example. Furthermore, the processing apparatus 200 is driven, for example, by power supplied from an internal power source such as a battery provided to the processing apparatus 200, power supplied from a connected external power source, and the like. Note that the hardware configuration of the processing apparatus 200 according to the present embodiment is not limited to the hardware configuration similar to that of the verification apparatus 100 shown in FIG. 7. For example, the processing apparatus 200 can have a configuration according to an application example of the processing apparatus 200 described later, for example.

Although a description has been given with the processing apparatus taken as a component of the information processing system according to the present embodiment above, the present embodiment is not limited to this form. The processing apparatus according to the present embodiment can be applied to any equipment that can perform processing using artificial intelligence such as, for example, "a computer such as a PC or a server", "a tablet device", "a game machine", "any moving object such as a car", "any robot such as a manipulator or a self-moving robot", or "drone (equipment that can be operated remotely or autonomously)". Furthermore, the processing apparatus according to the present embodiment can also be applied to an IC that can be incorporated into the equipment as described above, for example.

Program According to Present Embodiment

By executing a program for causing a computer system to function as the verification apparatus according to the present embodiment (for example, a program capable of realizing functions of the acquisition unit 110 and the verification unit 112) with a processor or the like in a computer system, it is possible to verify data for causing artificial intelligence to function in an apparatus. Here, examples of the computer system according to the present embodiment include a single computer or a plurality of computers. A series of processing is performed by the computer system according to the present embodiment.

Furthermore, by executing a program for causing a computer system to function as the verification apparatus according to the present embodiment with a processor or the like in the computer system, it is possible to exhibit the effect that is exhibited by the processing related to the information processing method according to the present embodiment described above.

The preferred embodiment of the present disclosure has been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

For example, in the information processing system 1000 shown in FIG. 5, an example has been shown in which the control data registered in the P2P database is used to share abilities through the network. However, the information processing system according to the present embodiment capable of sharing the abilities through the network is not limited to the example shown above. For example, the information processing system according to the present embodiment may be a centralized system such as a server-client system. As one example of a case where the information processing system according to the present embodiment is a centralized system, there is a system in which an apparatus functioning as a server manages various kinds of information including at least control data, while an apparatus functioning as a client acquires various kinds of information from the apparatus functioning as a server. Even in a case of a centralized system as described above, sharing of abilities through the network can be realized by causing artificial intelligence to function with acquired control data by the apparatus functioning as a client.

Furthermore, in the above, it has been shown that a program (computer program) for causing a computer system to function as the verification apparatus according to the present embodiment is provided, but the present embodiment can also provide a recording medium in which the program is stored.

The configuration described above shows an example of the present embodiment, and naturally belongs to the technical scope of the present disclosure.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Note that the following configurations are also within the technical scope of the present disclosure.

(1)

A verification apparatus including:

an acquisition unit configured to acquire each of control data that causes artificial intelligence to function in an apparatus and learning data of the control data; and a verification unit configured to verify the acquired control data on the basis of the control data obtained as a result of performing learning with use of the acquired learning data, and on the basis of the acquired control data.

(2)

The verification apparatus according to (1), in which the verification unit verifies that the acquired control data is data learned with use of the acquired learning data, by determining whether the control data obtained as a result of performing learning is coincident with the acquired control data.

(3)

The verification apparatus according to (2), in which the verification unit determines whether the control data obtained as a result of performing learning is coincident with the acquired control data by comparing binary between the control data obtained as a result of performing learning and the acquired control data.

(4)

The verification apparatus according to any one of (1) to (3), in which the verification unit causes transmission of data indicating a verification result to a set transmission destination.

(5)

The verification apparatus according to any one of (1) to (4), in which the verification unit registers data indicating a verification result to a P2P database.

(6)

The verification apparatus according to any one of (1) to (5), in which the learning data includes information indicating a network structure, a hyperparameter that is a parameter for learning, and a training data set for learning.

(7)

An information processing method to be executed by a verification apparatus, the information processing method including the steps of:

acquiring each of control data that causes artificial intelligence to function in an apparatus and learning data of the control data; and verifying the acquired control data on the basis of the control data obtained as a result of performing learning with use of the acquired learning data, and on the basis of the acquired control data.

(8)

A program for causing a computer to realize:

a function of acquiring each of control data that causes artificial intelligence to function in an apparatus and learning data of the control data; and a function of verifying the acquired control data on the basis of the control data obtained as a result of performing learning with use of the acquired learning data, and on the basis of the acquired control data.

REFERENCE SIGNS LIST

100 Verification apparatus
102 Communication unit
104 Control unit
110 Acquisition unit
112 Verification unit
200 Processing apparatus
300 Network
1000 Information processing system

The invention claimed is:

1. A verification apparatus comprising:
circuitry configured to function as:
an acquisition unit configured to acquire each of
control data that causes artificial intelligence to function in an apparatus and
learning data of the control data; and
a verification unit configured to verify the acquired control data on a basis of the control data obtained as a result of performing learning with use of the acquired learning data, and on a basis of the acquired control data.

2. The verification apparatus according to claim 1, wherein the verification unit verifies that the acquired control data is data learned with use of the acquired learning data, by determining whether the control data obtained as a result of performing learning is coincident with the acquired control data.

3. The verification apparatus according to claim 2, wherein the verification unit determines whether the control data obtained as a result of performing learning is coincident with the acquired control data by comparing binary between the control data obtained as a result of performing learning and the acquired control data.

4. The verification apparatus according to claim 1, wherein the verification unit causes transmission of data indicating a verification result to a set transmission destination.

5. The verification apparatus according to claim 1, wherein the verification unit registers data indicating a verification result to a peer to peer (P2P) database.

6. The verification apparatus according to claim 1, wherein the learning data includes information indicating a network structure, a hyperparameter that is a parameter for learning, and a training data set for learning.

7. An information processing method to be executed by a verification apparatus, the information processing method comprising the steps of:
acquiring each of
control data that causes artificial intelligence to function in an apparatus and
learning data of the control data; and
verifying the acquired control data on a basis of the control data obtained as a result of performing learning with use of the acquired learning data, and on a basis of the acquired control data.

8. A non-transitory storage medium encoded with instructions that, when executed by a computer, execute a method comprising:
acquiring each of
control data that causes artificial intelligence to function in an apparatus and
learning data of the control data; and
verifying the acquired control data on a basis of the control data obtained as a result of performing learning with use of the acquired learning data, and on a basis of the acquired control data.

* * * * *